(12) United States Patent
Kelly et al.

(10) Patent No.: US 10,932,609 B2
(45) Date of Patent: Mar. 2, 2021

(54) AIRCRAFT GALLEY BREWING APPARATUS

(71) Applicant: Rockwell Collins, Inc., Cedar Rapids, IA (US)

(72) Inventors: Luke E. Kelly, Basehor, KS (US); Brian P. Mills, Blue Springs, MO (US); Byron A. Devlin, Kansas City, MO (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 272 days.

(21) Appl. No.: 15/970,633

(22) Filed: May 3, 2018

(65) Prior Publication Data
US 2019/0335937 A1 Nov. 7, 2019

(51) Int. Cl.
*A47J 31/36* (2006.01)
*A47J 31/44* (2006.01)
*B64D 11/04* (2006.01)

(52) U.S. Cl.
CPC ......... *A47J 31/368* (2013.01); *A47J 31/4407* (2013.01); *A47J 31/4467* (2013.01); *B64D 11/04* (2013.01)

(58) Field of Classification Search
CPC .................................................. B64D 11/04
See application file for complete search history.

(56) References Cited

U.S. PATENT DOCUMENTS

| | | | | |
|---|---|---|---|---|
| 2,737,880 A | * | 3/1956 | Johnson | A47J 31/54 99/305 |
| 3,181,732 A | * | 5/1965 | Immermann | A47J 31/408 222/80 |
| 3,413,909 A | * | 12/1968 | Heler | A47J 31/0663 99/298 |
| 4,949,627 A | * | 8/1990 | Nordskog | A47J 31/005 99/281 |
| 6,047,630 A | * | 4/2000 | Brown | A47J 31/4425 99/275 |
| 6,050,175 A | * | 4/2000 | Mirand | A47J 31/4425 99/279 |
| 6,227,101 B1 | * | 5/2001 | Rabadi | A47J 31/005 99/280 |
| 6,779,435 B1 | * | 8/2004 | Iacobucci | A47J 31/005 392/449 |

(Continued)

OTHER PUBLICATIONS

Extended Search Report dated Oct. 30, 2019 for EP Application No. 19172190.1.

*Primary Examiner* — Jacob J Cigna
(74) *Attorney, Agent, or Firm* — Suiter Swantz pc llo

(57) ABSTRACT

A brewing apparatus may include a chassis dimensioned to fit within a compartment of an aircraft galley. The chassis may include a front chassis section and one or more guide rails configured to engage one or more tracks in the aircraft galley compartment. The front chassis section may include a brew head assembly with one or more server restraints or one or more brew cup restraints and a brew cup panel assembly. The brew cup panel assembly may include a hinge assembly configured to engage the brew head assembly and a brew cup panel. The brew cup panel may be coupled to the hinge assembly and may be configured to adjust the brew head assembly in a selected direction via actuation of the hinge assembly.

20 Claims, 12 Drawing Sheets

(56) References Cited

U.S. PATENT DOCUMENTS

| | | | |
|---|---|---|---|
| 6,904,840 B1 * | 6/2005 | Pfeifer | A47J 31/0668 99/289 R |
| 7,017,408 B2 * | 3/2006 | Ramus | A47J 31/44 73/293 |
| 8,061,263 B1 * | 11/2011 | Hannah | A47J 31/4403 116/107 |
| 2011/0061542 A1 * | 3/2011 | Jimenez | A47J 31/407 99/300 |
| 2011/0111107 A1 | 5/2011 | Rahn et al. | |
| 2012/0121779 A1 * | 5/2012 | Lai | A47J 31/3623 426/433 |
| 2019/0335937 A1 * | 11/2019 | Kelly | B64D 11/04 |

* cited by examiner

AIRCRAFT GALLEY BREWING APPARATUS

BACKGROUND OF THE INVENTION

Select brewing apparatuses include a handle assembly configured to engage a brew head of the brewing apparatus against a server within a cavity in a server base of the brewing apparatus. The handle assembly may include a panel handle, where the panel handle acts as a panel cover for the brew cavity. Where the brewing apparatus is installed within an aircraft galley, the handle assembly may be subject to increased regulatory aircraft galley requirements and/or standards. For example, the handle assembly may be required to withstand a force exerted by a user on the handle assembly during operation of the aircraft.

SUMMARY

In one aspect, the inventive concepts disclosed herein are directed to a brewing apparatus. The brewing apparatus may include a chassis dimensioned to fit within a compartment of an aircraft galley. The chassis may include a front chassis section. The chassis may include a rear chassis section. The chassis may include one or more guide rails configured to couple the front chassis section and the rear chassis section. The one or more guide rails may be configured to engage one or more tracks in the aircraft galley compartment. The front chassis section may include a server base including a cavity configured to receive a server. The front chassis section may include a brew cavity configured to receive a brew cup. The front chassis section may include a brew cup shelf including a recess. The front chassis section may include a recess configured to receive the brew cup. The front chassis section may include a brew head assembly. The brew head assembly may include at least one of one or more server restraints or one or more brew cup restraints. The front chassis section may include a brew cup panel assembly. The brew cup panel assembly may include a hinge assembly configured to engage the brew head assembly. The brew cup panel assembly may include a brew cup panel. The brew cup panel may be configured to cover the brew cavity. The brew cup panel may be coupled to the hinge assembly. The brew cup panel may be configured to adjust the brew head assembly in a selected direction via actuation of the hinge assembly.

In a further aspect, the inventive concepts disclosed herein are directed to a brewing apparatus. The brewing apparatus may include a chassis dimensioned to fit within a compartment of a vehicle. The chassis may include a front chassis section. The chassis may include a rear chassis section. The chassis may include one or more guide rails configured to couple the front chassis section and the rear chassis section. The one or more guide rails may be configured to engage one or more tracks in the vehicle compartment. The front chassis section may include a server base including a cavity configured to receive a server. The front chassis section may include a brew cavity configured to receive a brew cup. The front chassis section may include a brew cup shelf including a recess. The front chassis section may include a recess configured to receive the brew cup. The front chassis section may include a brew head assembly. The brew head assembly may include at least one of one or more server restraints or one or more brew cup restraints. The front chassis section may include a brew cup panel assembly. The brew cup panel assembly may include a hinge assembly configured to engage the brew head assembly. The brew cup panel assembly may include a brew cup panel. The brew cup panel may be configured to cover the brew cavity. The brew cup panel may be coupled to the hinge assembly. The brew cup panel may be configured to adjust the brew head assembly in a selected direction via actuation of the hinge assembly.

In a further aspect, the inventive concepts disclosed herein are directed to a brewing apparatus. The brewing apparatus may include a chassis. The chassis may include a front chassis section. The chassis may include a rear chassis section. The chassis may include one or more guide rails configured to couple the front chassis section and the rear chassis section. The front chassis section may include a server base including a cavity configured to receive a server. The front chassis section may include a brew cavity configured to receive a brew cup. The front chassis section may include a brew cup shelf including a recess. The front chassis section may include a recess configured to receive the brew cup. The front chassis section may include a brew head assembly. The brew head assembly may include at least one of one or more server restraints or one or more brew cup restraints. The front chassis section may include a brew cup panel assembly. The brew cup panel assembly may include a hinge assembly configured to engage the brew head assembly. The brew cup panel assembly may include a brew cup panel. The brew cup panel may be configured to cover the brew cavity. The brew cup panel may be coupled to the hinge assembly. The brew cup panel may be configured to adjust the brew head assembly in a selected direction via actuation of the hinge assembly.

It is to be understood that both the foregoing general description and the following detailed description are exemplary and explanatory only and are not necessarily restrictive of the present disclosure. The accompanying drawings, which are incorporated in and constitute a part of the characteristic, illustrate subject matter of the disclosure. Together, the descriptions and the drawings serve to explain the principles of the disclosure.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION OF EXEMPLARY EMBODIMENTS

Figure 1:
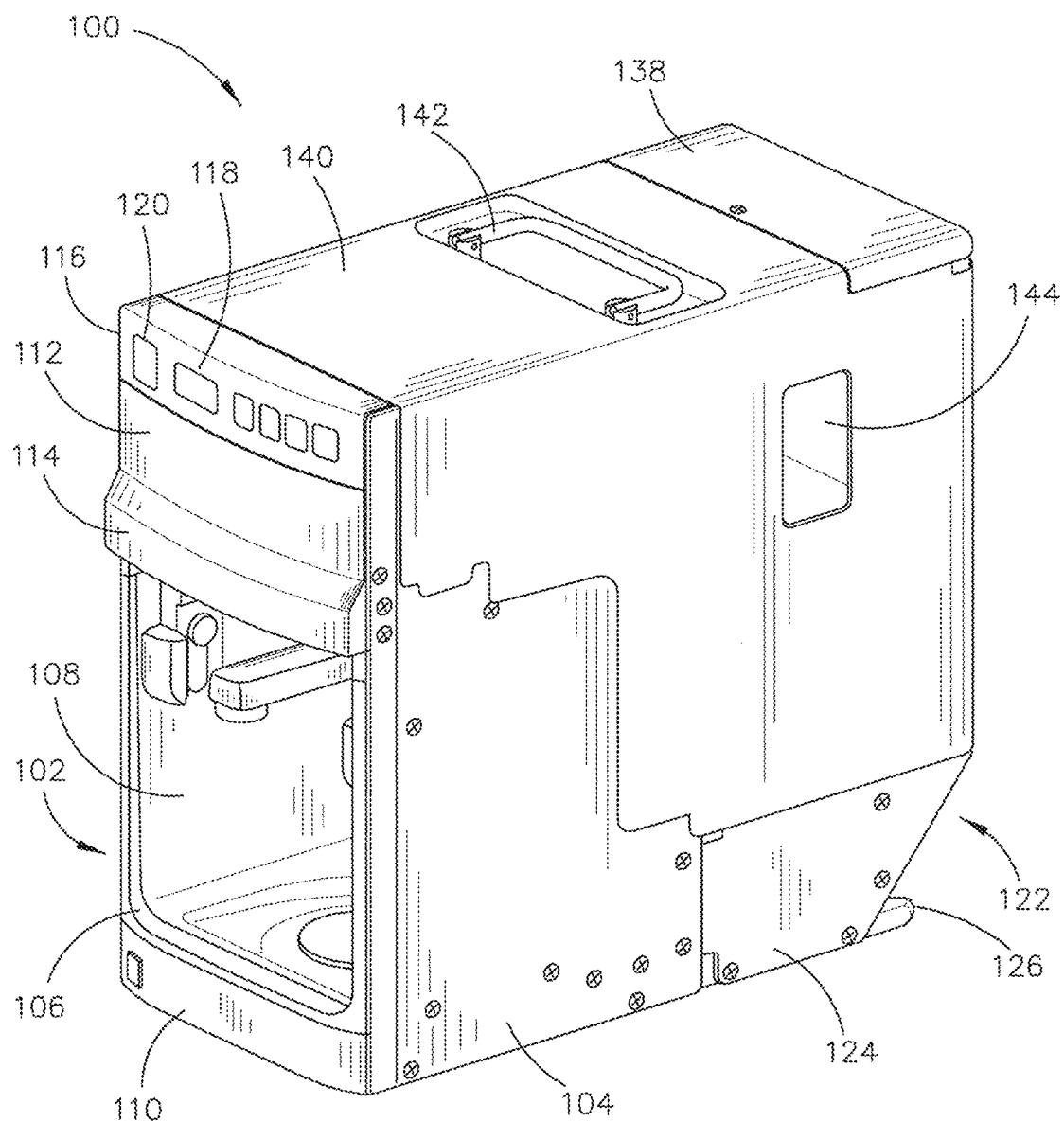
FIG. 1 is an isometric view of a diagrammatic illustration of an exemplary embodiment of an aircraft galley brewing apparatus according to the inventive concepts disclosed herein.

Reference will now be made in detail to the subject matter disclosed, which is illustrated in the accompanying drawings.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a' and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of or sub-combination of two or more such features, along with any other features which may not necessarily be expressly described or inherently present in the instant disclosure.

Broadly, embodiments of the inventive concepts disclosed herein are directed to a brewing apparatus. More particularly, embodiments of the inventive concepts disclosed herein are directed to a brewing apparatus, where the apparatus includes the capability to hold a filter pack within a brew cup behind a brew cup panel and the capability to secure a container housed within a container chamber during operation of the brewing apparatus, where the brewing apparatus is configured to couple to and operate in an aircraft galley.

FIGS. 1-10B generally illustrate exemplary embodiments of a diagrammatic illustration of a brewing apparatus 100 according to the inventive concepts disclosed herein.

It is noted herein the brewing apparatus 100 may be coupled to and/or configured to operate in any type of vehicle known in the art. For example, the vehicle may be any air, land, or water-based personal equipment or vehicle; any air, land, or water-based commercial equipment or vehicle; or any air, land, or water-based military equipment or vehicle known in the art. For example, the vehicle may be a passenger aircraft. For instance, the passenger aircraft may include the brewing apparatus 100 and one or more on-board systems (e.g., water storage tanks, water sanitation systems, controllers in communication with the brewing apparatus 100, or the like) coupled to the brewing apparatus 100.

In addition, it is noted herein the brewing apparatus 100 and/or select components of the brewing apparatus 100 may be configured in accordance with guidelines and/or standards put forth by, but not limited to, the Federal Aviation Administration (FAA), the European Aviation Safety Agency (EASA) or any other flight certification agency or organization; the American National Standards Institute (ANSI), Aeronautical Radio, Incorporated (ARINC), or any other standards setting organization or company; the Radio Technical Commission for Aeronautics (RTCA) or any other guidelines agency or organization; or the like.

Referring now to FIG. 1, an isometric view of a diagrammatic illustration of an exemplary embodiment of a brewing apparatus 100 according to the inventive concepts is disclosed herein.

The brewing apparatus 100 may include a chassis. The chassis may be constructed from one or more chassis sections. It is noted herein the entire chassis or the one or more chassis sections may be fabricated from any plastic or metal known in the art. In addition, it is noted herein the one or more chassis sections may be coupled together via one or more couplers. For example, the one or more couplers may include, but are not limited to, a fastener, an adhesive, a tongue-and-groove assembly, a tab-and-slot assembly, a friction clip assembly, a latching assembly, or the like.

Generally, the chassis may house one or more components of a brewing system, the brewing system including one or more heating subsystems with any number of heating components known in the art (e.g., one or more heating elements, one or more heat-resistant components, or the like), one or more plumbing subsystems with any number of plumbing components known in the art (e.g., fluidic components including one or more pipes and pipe couplers, one or more tubes and tube couplers, or the like), and/or one or more electrical subsystems with any number of electrical components known in the art (e.g., one or more wire harnesses, one or more terminal blocks, one or more sensors, or the like). It is noted herein the various systems and subsystems within the brewing apparatus 100 may share any number of components.

The chassis may include a front chassis section 102. The front chassis section 102 may include a front chassis assembly 104.

The front chassis assembly 104 may include and/or be coupled to a server base 106. It is noted herein that, where the brewing apparatus 100 is installed in an aircraft galley, the server base 106 may be configured such that coffee may drain into the server at an angle of descent up to three degrees.

The server base 106 may include a cavity 108 dimensioned to receive a server. For example, the server may include, but is not limited to, a carafe or other container known in the art capable of holding a heated liquid. By way of another example, the server may be insulated or non-insulated. The cavity 108 and/or the server base 106 may include one or more safety devices configured to determine whether the server is located within the cavity 108. The one or more safety devices may include, but are not limited to, one or more electrical sensors and/or the one or more mechanical assemblies known in the art. For example, the one or more electrical sensors and/or the one or more mechanical assemblies may include, but are not limited to, one or more pressure sensors, one or more infrared (IR) sensors, one or more magnetic switches, or any sensor known in the art. It is noted herein that the brewing apparatus 100 may be configured to be non-operational when the server is not detected within the cavity 108.

The front chassis assembly 104 may include and/or be coupled to a placard or plate 110. For example, the placard or plate 110 may include general information about the brewing apparatus 100 including, but not limited to, one or more manufacturer or consumer logos, one or more informational labels for the brewing apparatus 100 (e.g., either specific to the brewing apparatus 100 or as required by regulations for any similar apparatus), or the like.

The front chassis assembly 104 may include and/or be coupled to a brew cup panel 112. The brew cup panel 112 may be held in a closed position or closed orientation via one or more mechanical detents. For example, the one or more mechanical detents may include any assembly configured to prevent motion until a force is applied including, but not limited to, a catch, a dog, a spring dampener assembly (e.g., a spring-operated ball), or the like. Alternatively, or in addition, the brew cup panel 112 may be held in a closed position or closed orientation by engaging the front chassis section 102 with one or more couplers. For example, the one or more couplers may include, but are not limited to, a fastener, a tongue-and-groove assembly, a tab-and-slot assembly, a friction clip assembly, a latching assembly, or the like.

It is noted herein that the brew cup panel 112 may be held in a selected position or orientation (e.g., an "open position" or "open orientation," a "closed position" or "closed orientation," or the like) with the mechanical detent. A select amount of force may be required when adjusting the brew cup panel 112 from a "closed position" to an "open position" and/or vice versa to overcome the mechanical detent. In this regard, the brew cup panel 112 and a container within the chamber 108 of the server base 106 may be operated by a user with one hand, as the mechanical detent may hold the brew cup panel 112 in an "open position" to allow the user to operate the container within the chamber 108 with the same hand.

The brew cup panel 112 may include an operator 114. The brew cup panel 112 may be actuated (e.g., opened and/or closed, or the like) via the operator 114. The operator 114 may include, but is not limited to, a slot, a tab, a bar, or the like. For example, the operator 114 may be a slot between a first front surface of the brew cup panel 112 and a second front surface extruded a selected distance from a plane defined by the first front surface of the brew cup panel 112. By way of another example, the operator 114 may be configured to receive and/or interact with at least a portion of a user's hand. The operator 114 may include a trigger to release the one or more couplers holding the brew cup panel 112 closed by engaging the front chassis section 102. For example, the trigger may be electrically-actuated. For instance, the trigger may include, but is not limited to, a capacitive touch sensor, or the like. By way of another example, the trigger may be mechanically-actuated. For instance, the trigger may include, but is not limited to, a push-push assembly, a latch assembly, a friction clip assembly, or the like.

The brew cup panel 112 and the operator 114 may be fabricated as a single component during the manufacturing process of the brew cup panel 112. In this regard, the operator 114 provides an added functionality and an increased level of visual aesthetics to the design of the brewing apparatus 100. It is noted herein, however, that the operator 114 may be a separate component (e.g., a handle) coupled to the first front surface of the brew cup panel 112. Where the brewing apparatus 100 is installed within an aircraft galley, a handle may be subject to increased regulatory aircraft galley requirements and/or standards than if the operator 114 is an integrated fabricated component with the brew cup panel 112. Therefore, the above description should not be interpreted as a limitation on the present disclosure but merely an illustration.

The brewing apparatus 100 may include one or more safety devices that are triggered when the brew cup panel 112 is closed, to prevent the brewing apparatus 100 from operating when the brew cup panel 112 is open. For example, the one or more safety devices may include, but are not limited to, one or more electrical sensors, one or more mechanical assemblies, or the like. In this regard, the brew cup panel 112 may need to be closed to trigger a safety switch, rendering a brewing cycle of the brewing apparatus 100 operable.

The front chassis assembly 104 may include and/or be coupled to a user interface 116. The user interface 116 may include and/or be configured to interact with one or more display devices 118. The user interface 116 may include and/or be configured to interact with one or more user input devices 120.

The user interface 116 may be a panel separate from the brew cup panel 112 and coupled to the front chassis assembly 104. It is noted herein, however, that the user interface 116 may be at least partially embedded within the brew cup panel 112. Therefore, the above description should not be interpreted as a limitation on the present disclosure but merely an illustration.

The one or more display devices 118 may be a human-machine interface (HMI) configured to provide a user with one or more messages with respect to the operation of the brewing apparatus 100. For example, the one or more messages may include, but are not limited to, status of the brewing cycle (e.g., type of brew, strength of brew, brew time remaining, or the like), user prompts (e.g., general operating information, warning messages, or the like), or the like. For instance, where the brewed liquid is coffee, a message about brew time remaining may be utilized by a user of the brewing apparatus 100 to ensure the taste of the brewed liquid is not affected by insufficient or excessive brew time. By way of another example, where the brewing apparatus 100 is installed on a vehicle (e.g., aircraft, or the like), the one or more messages may include, but are not limited to, one or more vehicle operation and/or status updates.

The one or more display devices 118 may include any display device known in the art. For example, the one or more display devices 118 may include, but are not limited to, a liquid crystal display (LCD), a light-emitting diode (LED) display, an organic light-emitting diode (OLED) based display, or the like. Those skilled in the art should recognize that a variety of display devices may be suitable for implementation in the present disclosure and the particular choice of display device may depend on a variety of factors, including, but not limited to, form factor, cost, and the like. In a general sense, any display device 118 capable of integration with a user input device 120 (e.g., touchscreen, bezel mounted interface, keyboard, mouse, trackpad, and the like) is suitable for implementation in the present disclosure.

The one or more user input devices 120 may include any user input device known in the art. For example, the one or more user input devices 120 may include, but are not limited to, a keyboard, a keypad, a touchscreen, a lever, a knob, a scroll wheel, a track ball, a switch, a dial, a sliding bar, a scroll bar, a slide, a touch pad, a paddle, a steering wheel, a joystick, a button, a bezel input device or the like. In the case of a touchscreen interface, those skilled in the art should recognize that a large number of touchscreen interfaces may be suitable for implementation in the present disclosure. For instance, a display device 118 may be integrated with a touchscreen interface, such as, but not limited to, a capacitive touchscreen, a resistive touchscreen, a surface acoustic based touchscreen, an infrared based touchscreen, or the like. In a general sense, any touchscreen interface capable of integration with the display portion of a display device 118 is suitable for implementation in the present disclosure. The one or more user input devices 120 may additionally include, but are not limited to, a bezel mounted interface.

The user interface 116 may be configured to interact with and/or be integrated with a controller. For example, the controller may be housed within the brewing apparatus 100. By way of another example, the controller may be a component external to the brewing apparatus 100. For instance, the controller may be a component of a controller of a vehicle (e.g., aircraft, or the like) in which the brewing apparatus 100 is installed. The controller may include one or more processors and memory. The memory may store one or more databases and/or a set of program instructions. The one or more processors may be configured to communicate with the one or more databases (e.g., receive and/or transmit a set of data) and/or execute the set of program instructions.

The controller may be configured to receive and/or acquire data or information from components, systems, and/or components of systems (e.g., brewing systems, heating subsystems, plumbing subsystems, electrical subsystems, or the like) of the brewing apparatus 100 by a transmission medium that may include wireline and/or wireless portions. The controller may additionally be configured to transmit data or information to components, systems, and/or components of systems (e.g., the brewing systems, heating subsystems, plumbing subsystems, electrical subsystems, or the like) of the brewing apparatus 100 by a transmission medium that may include wireline and/or wireless portions. In this regard, the transmission medium may serve as a data link between the controller and the systems of the brewing apparatus 100. Additionally, the controller may be configured to send data to external systems (e.g., a controller of a vehicle in which the brewing apparatus 100 is installed) via a transmission medium (e.g., network connection).

It is noted herein that components, systems, and/or components of systems (e.g., the brewing systems, heating subsystems, plumbing subsystems, electrical subsystems, or the like) of the brewing apparatus 100 may be configured to receive and/or transmit data between one another directly (e.g., without the need for an intermediary such as the controller). Therefore, the above description should not be interpreted as a limitation on the present disclosure but merely an illustration.

The one or more processors may include any one or more processing elements known in the art. In this sense, the one or more processors may include any microprocessor device configured to execute algorithms and/or program instructions. For example, the one or more processors may consist of a vehicle on-board computer, handheld computer (e.g., tablet, smartphone, or phablet), desktop computer, mainframe computer system, workstation, image computer, parallel processor, or other computer system (e.g., networked computer) configured to cause the brewing apparatus 100 to perform one or more of the inventive concepts disclosed herein. It should be recognized that the steps described throughout the present disclosure may be carried out by a single computer system or, alternatively, multiple computer systems. In general, the term "processor" may be broadly defined to encompass any device (e.g., a system on a chip (SOC), a field programmable gate array (FPGA), an application-specific integrated circuit (ASIC), or the like) including one or more processing elements, which execute the one or sets of program instructions from a non-transitory memory medium (e.g., the memory). Moreover, different components, systems, and/or components of systems (e.g., brewing systems, heating subsystems, plumbing subsystems, electrical subsystems, or the like) of the brewing apparatus 100 may include processor or logic elements suitable for carrying out at least a portion of the steps described throughout the present disclosure. Therefore, the above description should not be interpreted as a limitation on the present disclosure but merely an illustration.

The memory may include any storage medium known in the art suitable for storing the set of program instructions executable by the associated one or more processors to carry out the various steps of the inventive concepts disclosed herein. For example, the memory may include a non-transitory memory medium. For instance, the memory may include, but is not limited to, a read-only memory (ROM), a random access memory (RAM), a magnetic or optical memory device (e.g., disk), a magnetic tape, a solid-state drive and the like. The memory may be configured to provide display information to a display device 118 of the user interface 116 and/or the output of the various steps of the inventive concepts disclosed herein. The memory may be housed in a common controller housing with the one or more processors. The memory may, alternatively or in addition, be located remotely with respect to the physical location of the processors and/or the controller. For instance, the one or more processors and/or the controller may access a remote memory (e.g., server), accessible through a network (e.g., internet, intranet, and the like).

The one or more databases stored within the memory may include data that assists the controller in determining whether the brewing apparatus 100 meets a pre-determined baseline of safe operation. For example, the data may be received from one or more sensors coupled to the components, systems, and/or components of systems (e.g., the brew cup panel 112, heating subsystems, plumbing subsystems, electrical subsystems, or the like) of the brewing apparatus 100. By way of another example, the pre-determined baseline of safe operation may be pre-loaded into the memory prior to operation and/or may be received by the controller during operation.

The set of program instructions may include a set of program instructions configured to cause the one or more processors to receive data from the components, systems, and/or components of systems (e.g., brewing systems, heating subsystems, plumbing subsystems, electrical subsystems, or the like) of the brewing apparatus 100. The set of program instructions include a set of program instructions configured to cause the one or more processors to analyze the received data from components, systems, and/or components of systems (e.g., brewing systems, heating subsystems, plumbing subsystems, electrical subsystems, or the like) of the brewing apparatus 100. The set of program instructions may additionally include a set of program instructions configured to cause the one or more processors to determine an operation state based on the analyzed set of data from components, systems, and/or components of systems (e.g., brewing systems, heating subsystems, plumbing subsystems, electrical subsystems, or the like) of the brewing apparatus 100.

The set of program instructions may be configured to operate via a control algorithm, a neural network (e.g., with states represented as nodes and hidden nodes and transitioning between them until an output is reached via branch metrics), a kernel-based classification method, a Support Vector Machine (SVM) approach, canonical-correlation analysis (CCA), factor analysis, flexible discriminant analysis (FDA), principal component analysis (PCA), multidimensional scaling (MDS), principal component regression (PCR regression), projection pursuit, data mining, prediction-making, exploratory data analysis, supervised learning analysis, boolean logic (e.g., resulting in an output of a complete truth or complete false value), fuzzy logic (e.g., resulting in an output of one or more partial truth values instead of a complete truth or complete false value), or the like. For example, in the case of a control algorithm, the set of program instructions may be configured to operate via proportional control, feedback control, feedforward control, integral control, proportional-derivative (PD) control, proportional-integral (PI) control, proportional-integral-derivative (PID) control, or the like.

In one example, where the brewing apparatus 100 is installed on an aircraft, the brewing apparatus 100 controller may be communicatively coupled with an onboard galley network controller of the aircraft. The brewing apparatus 100 controller may be configured to transmit and/or receive data from the onboard galley network controller of the aircraft. For example, the brewing apparatus 100 controller may be configured to record event logs and may transmit the event logs to the onboard galley network controller. By way of another example, the brewing apparatus 100 controller may be configured to receive information and/or commands from the onboard galley network controller, either in response to or independent of transmitted event logs.

Figure 2:
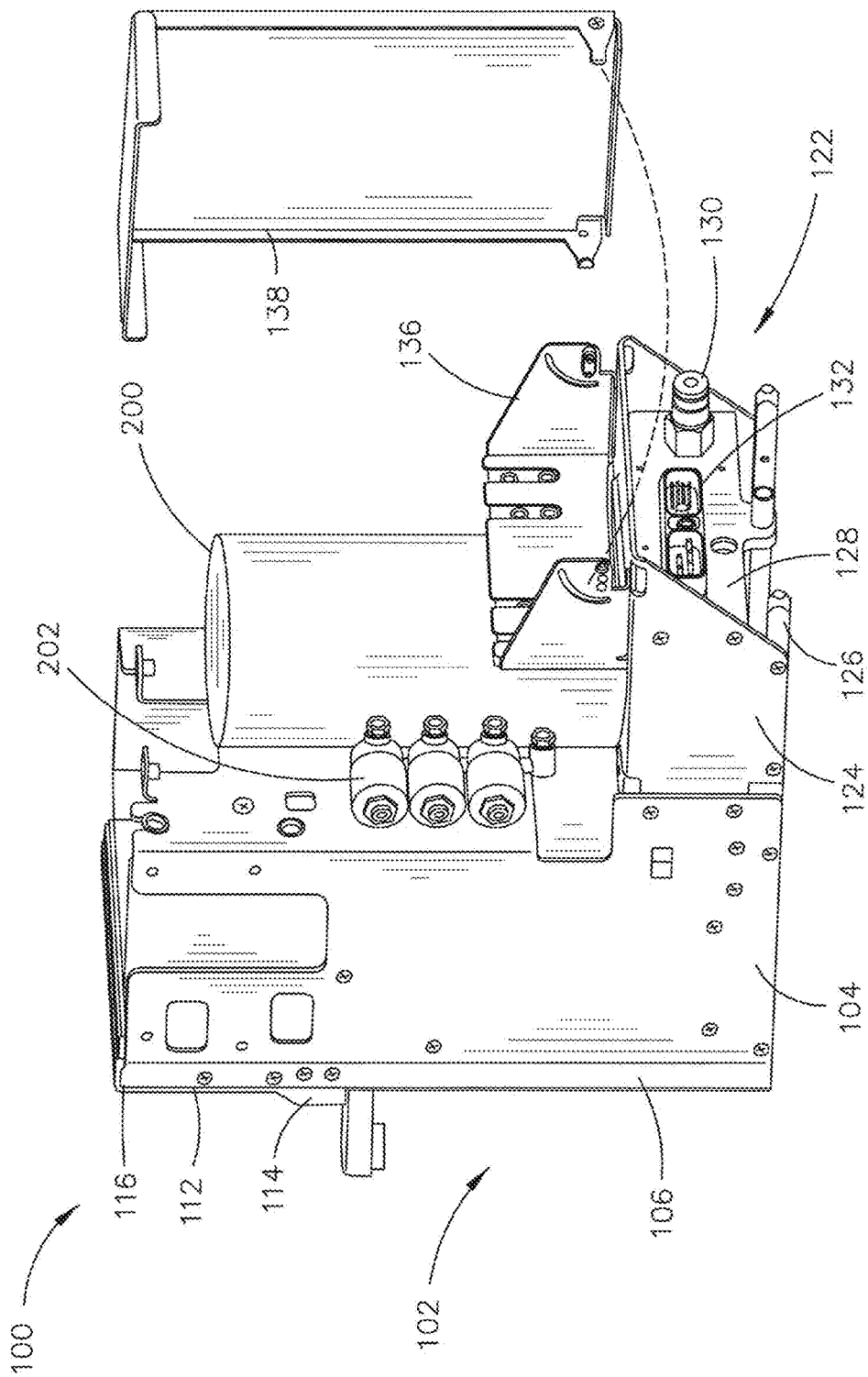
FIG. 2 is a partial exploded view of a diagrammatic illustration of an exemplary embodiment of an aircraft galley brewing apparatus according to the inventive concepts disclosed herein.

Referring now to FIG. 2, a partial exploded view of a diagrammatic illustration of an exemplary embodiment of the brewing apparatus 100 according to the inventive concepts is disclosed herein.

The chassis may include a rear chassis section 122. The rear chassis section 122 may include a support bracket assembly 124. The chassis may include one or more guide rails 126. For example, the one or more guide rails 126 may be coupled to the front chassis assembly 104 and/or the support bracket assembly 124. By way of another example, the one or more guide rails 126 may secure the brewing apparatus 100 to prevent displacement when a vehicle (e.g., aircraft, or the like) in which the brewing apparatus 100 is installed is in motion. For instance, where the vehicle is an aircraft, the one or more guide rails 126 may be configured to engage one or more mated slots or tracks within a compartment (e.g., cavity or galley insert) in an aircraft galley.

Figure 10A:
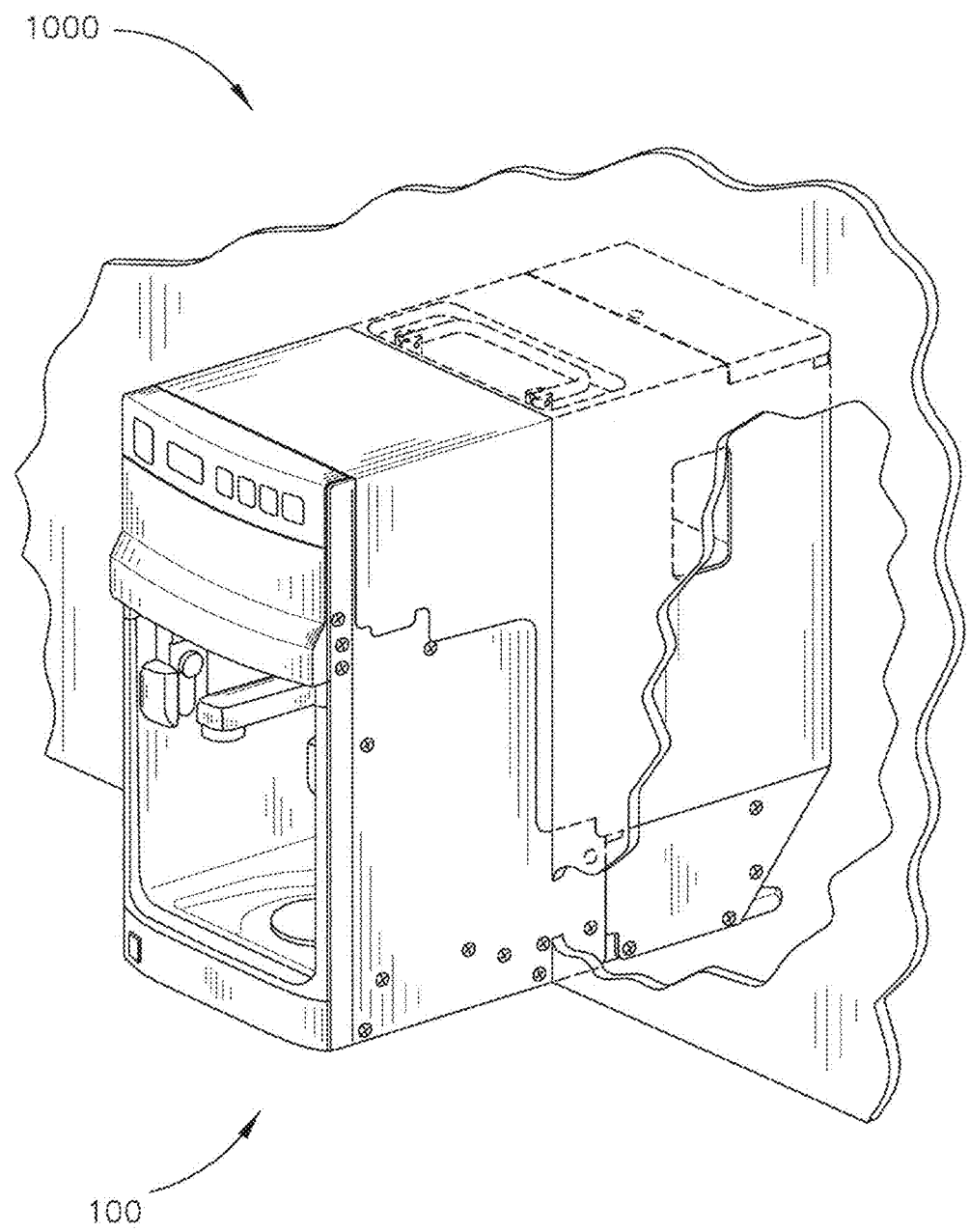
FIG. 10A is an isometric view of a diagrammatic illustration of an exemplary embodiment of a brewing apparatus in an aircraft galley environment according to the inventive concepts disclosed herein.
Figure 10B:
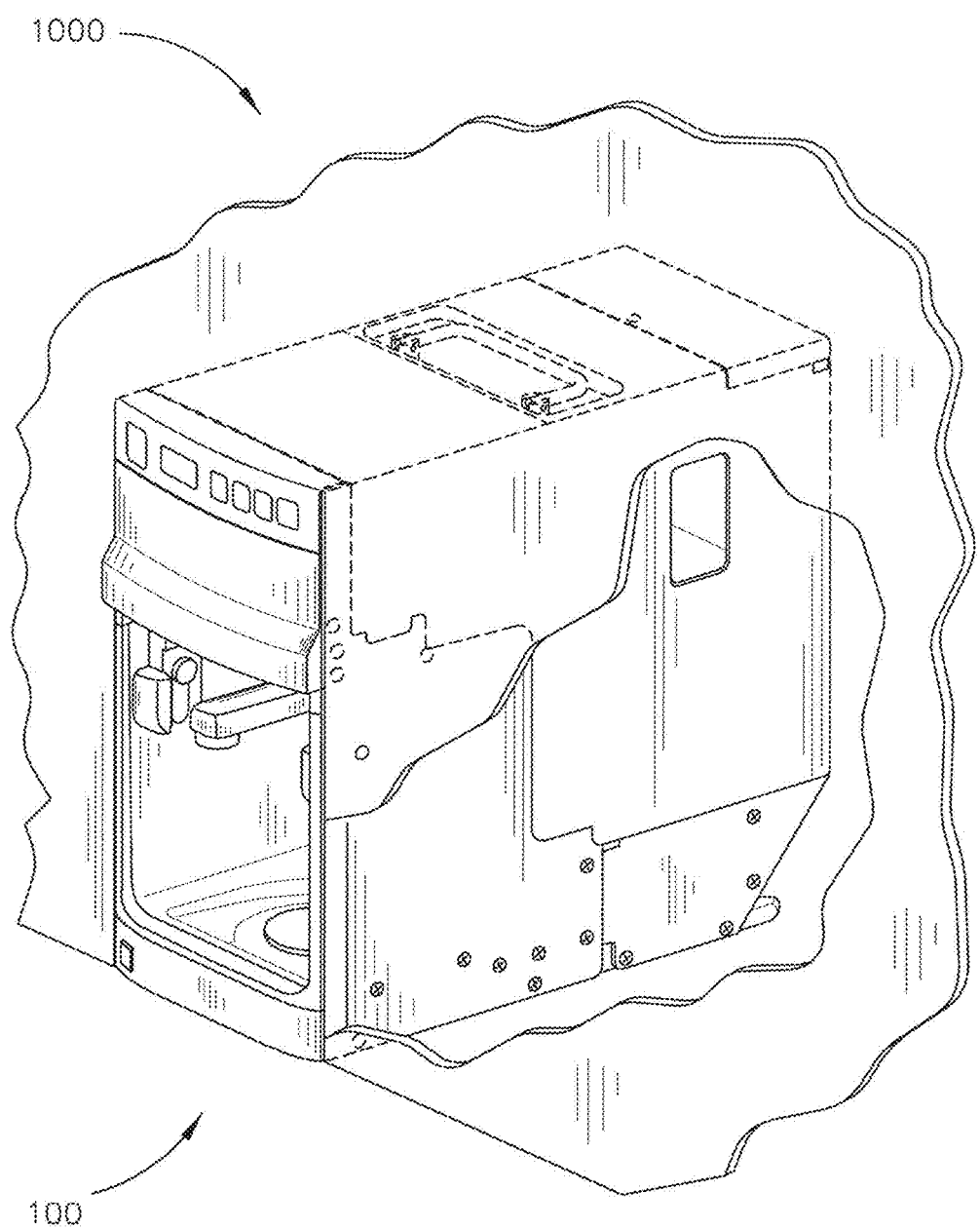
FIG. 10B is an isometric view of a diagrammatic illustration of an exemplary embodiment of a brewing apparatus in an aircraft galley environment according to the inventive concepts disclosed herein.

FIGS. 10A and 10B generally illustrate exemplary embodiments of the brewing apparatus 100 in an aircraft galley environment 1000 according to the inventive concepts disclosed herein. The brewing apparatus 100 may be configured and/or dimensioned to fit within a galley compartment, galley cavity, or the like in an aircraft galley. For example, as illustrated in FIG. 10A, the brewing apparatus 100 may be partially inserted within a compartment of the aircraft galley. By way of another example, as illustrated in FIG. 10B, the brewing apparatus 100 may be fully inserted in the compartment of the aircraft galley such that a front surface of the brewing apparatus 100 is flush with surrounding aircraft galley compartments, aircraft galley apparatuses, and/or aircraft galley instruments. The brewing apparatus 100 may be configured and/or dimensioned to meet or exceed select regulations and/or design definitions. For example, the design of the brewing apparatus 100 may meet or exceed ARINC 810 definitions. For instance, brewing apparatus 100 may fit within a size 1 galley, which is limited to a 12.5-inch height×7-inch width×12-inch depth footprint.

It is noted herein, however, that the brewing apparatus 100 may not be required to meet any regulations or design definitions. Therefore, the above description should not be interpreted as a limitation on the present disclosure but merely an illustration.

Referring again to FIG. 2, the rear chassis section 122 may include a connector plate 128. A drain tube assembly may be routed through the connector plate 128. The connector plate 128 may include one or more fluidic couplers 130. For example, the one or more fluidic couplers 130 may be configured to receive water from storage on the vehicle. By way of another example, the one or more fluidic couplers 130 may be configured to remove waste via one or more draining processes from the brewing apparatus 100. The connector plate 128 may include a power input harness assembly 132 configured to receive power, data, and/or control commands from a vehicle. It is noted herein that, where the vehicle is an aircraft, the power input harness assembly 132 may include one or more data couplers such that the brewing apparatus 100 meets or exceeds select regulations and/or design definitions. For example, the one or more data couplers may be selected to meet or exceed ARINC 812 definitions. It is noted herein, however, that the brewing apparatus 100 may not be required to meet any regulations or design definitions. Therefore, the above description should not be interpreted as a limitation on the present disclosure but merely an illustration.

The support bracket assembly 124 may include a hinge plate 136. The hinge plate 136 may be coupled to an access cover 138. The access cover 138 may be opened to allow access to internal components of the brewing apparatus 100 while remaining attached to the support bracket assembly 124.

The access cover 138 may provide access to the controller. For example, the controller may be coupled to the access cover 138, such that opening the access cover 138 provides access to the controller. For instance, the hinge plate 136 may include one or more grooves, through which one or more electrical connections pass through to and/or from the controller coupled to the access cover 138. By way of another example, one or more components, systems, and/or components of systems (e.g., brewing systems, heating subsystems, plumbing subsystems, electrical subsystems, or the like) of the brewing apparatus 100 may be accessible via the access cover 138.

The chassis may include one or more tanks 200. The one or more tanks 200 may be coupled to one or more solenoid valves 202. For example, the one or more solenoid valves 202 may open or close to allow water to pass through from the one or more tanks 200 to a specific plumbing subsystem of the brewing apparatus 100. For instance, the brewing apparatus 100 may include a solenoid valve 202 for each plumbing subsystem of the brewing apparatus 100. It is noted herein the brewing apparatus 100 may heat the water either within the one or more tanks 200 and/or during transport through a heated plumbing subsystem of the brewing apparatus 100 to selected temperatures for selected intervals to effect selected levels of coffee extraction from coffee grounds within a coffee filter pack. For example, the water within the brewing apparatus 100 may be heated to temperatures meeting or exceeding 191 degrees Fahrenheit.

Referring again to FIG. 1, the chassis may include a cover assembly 140. The cover assembly 140 may include a carrier handle 142. For example, the carrier handle 142 may allow for easy transportation of the brewing apparatus 100, including in and out of a vehicle (e.g., aircraft, or the like), by a user. The cover assembly 140 may include one or more access ports 144. Although the cover assembly 140 is shown as a single piece/panel in FIG. 1, it is noted herein the cover assembly 140 may be constructed from two or more pieces/panels. Therefore, the above description should not be interpreted as a limitation on the present disclosure but merely an illustration.

The access cover 138 may be coupled to the cover assembly 140 via one or more couplers. For example, the one or more couplers may include, but are not limited to, a fastener, a tongue-and-groove assembly, a tab-and-slot assembly, a friction clip assembly, a latching assembly, or the like. By way of another example, the access cover 138 may be coupled to the cover assembly 140 via one or more couplers in addition to, or in place of, a hinge assembly coupled to the hinge plate 136. In this regard, where the brewing apparatus 100 does not include the hinge assembly, the access cover 138 may be fully removable from the brewing apparatus 100.

FIGS. 3A-3D generally illustrate exemplary embodiments of a diagrammatic illustration of a brew cup 300 for the brewing apparatus 100 according to the inventive concepts disclosed herein.

The brew cup 300 may include one or more walls 302 and a bottom 304. The one or more walls 302 and the bottom 304 may be fabricated as a single component during the manufacturing process of the brew cup 300. It is noted herein, however, that the bottom 304 may be a separate component coupled to the one or more walls 302 (e.g., via an adhesive, a fastener, or the like).

The brew cup 300 may include a brew cup tray 306. The brew cup tray 306 may receive a filter pack (e.g., coffee pillow pack, or the like). The brew cup tray 306 may restrict the flow of heated water through the brew cup 300, holding the brewing liquid against the filter pack during a brew cycle. The brew cup tray 306 may be coupled to the one or more walls 302 via one or more fasteners. For example, the one or more fasteners may operate as a hinge assembly to assist a user in removing the filter pack from the brew cup 300.

The bottom 304 of the brew cup 300 may include one or more protrusions 308 extending into the volume encapsulated by the one or more walls 302. The brew cup tray 306 may include one or more dimples 310 corresponding to the one or more protrusions 308. The brew cup tray 306 may be removable and orientable within the brew cup 300. In this regard, the brew cup 300 may be configured to accept different sizes of filter packs.

Figure 3A:
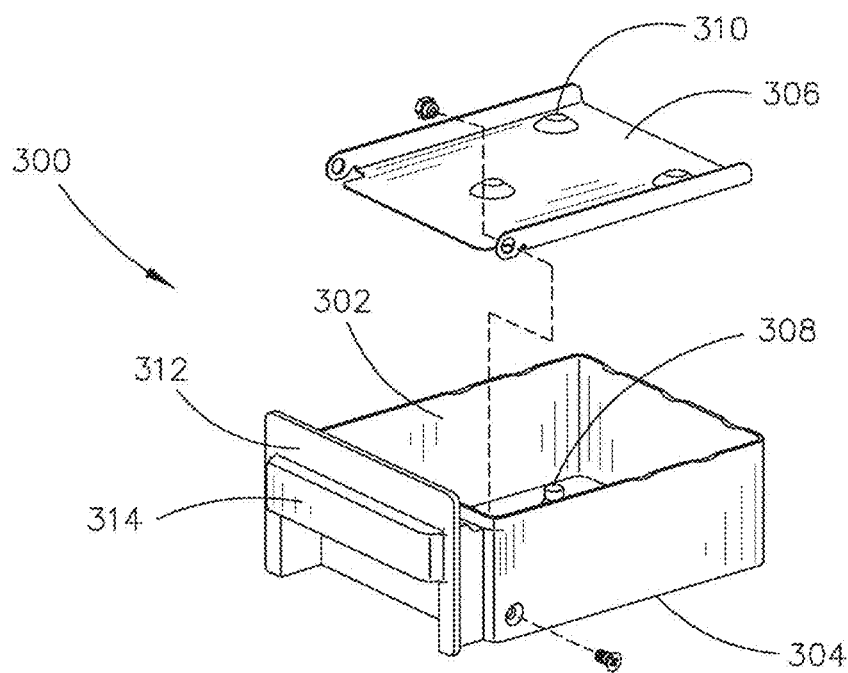
FIG. 3A is an exploded view of a diagrammatic illustration of an exemplary embodiment of a brew cup for an aircraft galley brewing apparatus according to the inventive concepts disclosed herein.
Figure 3B:
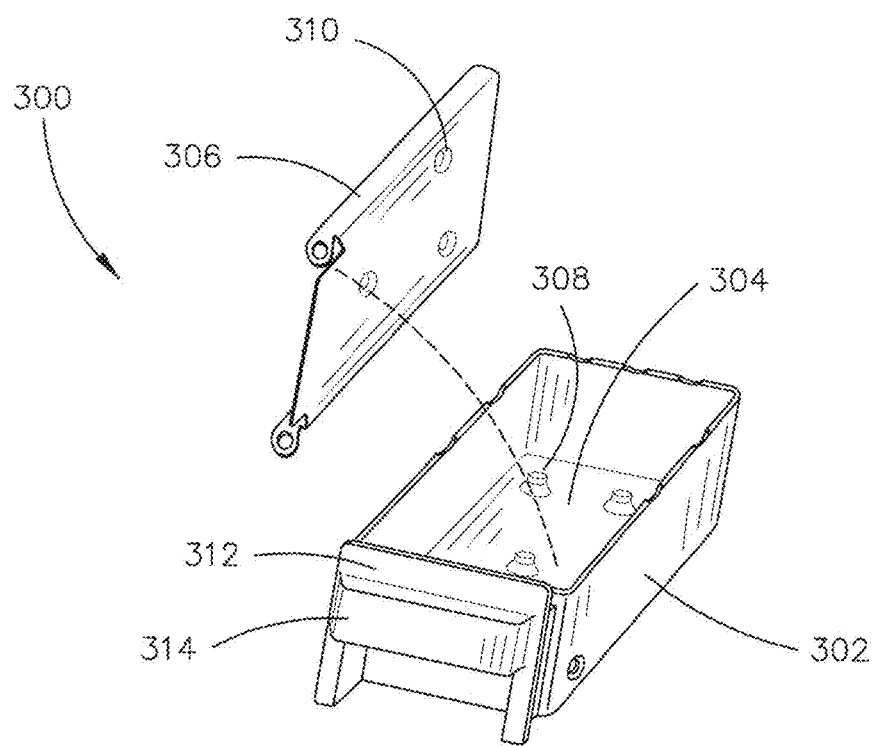
FIG. 3B is an exploded view of a diagrammatic illustration of an exemplary embodiment of a brew cup for an aircraft galley brewing apparatus according to the inventive concepts disclosed herein.
Figure 3C:
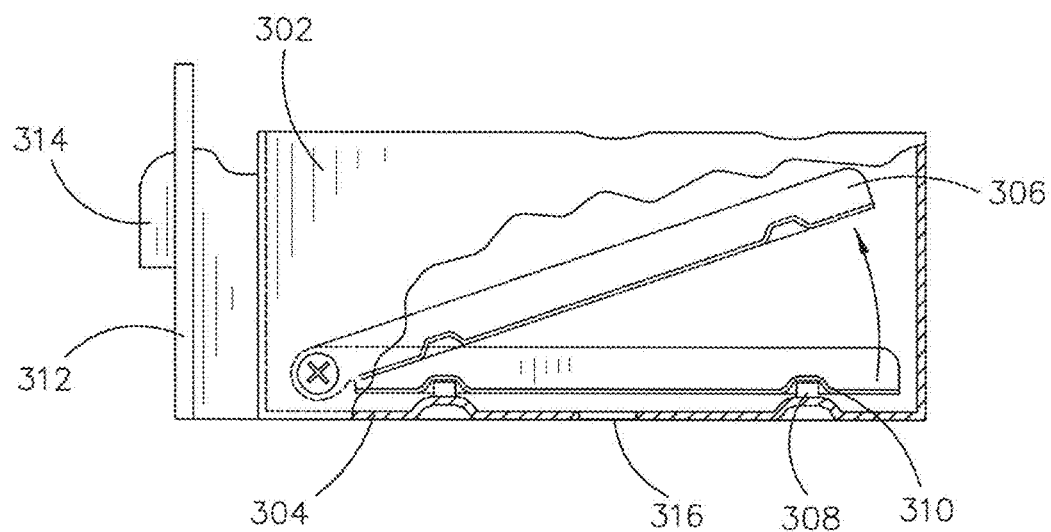
FIG. 3C is a side view of a diagrammatic illustration of an exemplary embodiment of a brew cup for an aircraft galley brewing apparatus according to the inventive concepts disclosed herein.
Figure 3D:
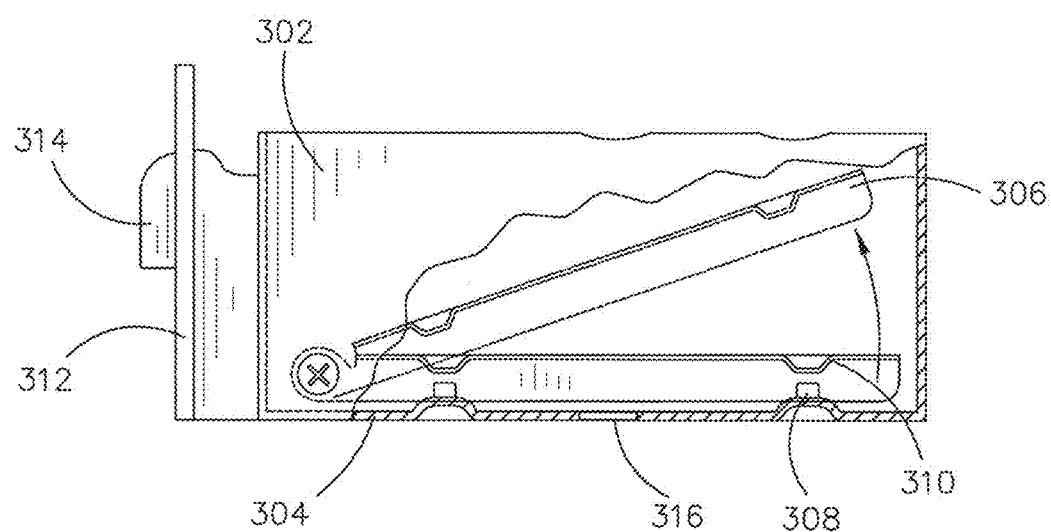
FIG. 3D is a side view of a diagrammatic illustration of an exemplary embodiment of a brew cup for an aircraft galley brewing apparatus according to the inventive concepts disclosed herein.

It is noted herein that orienting the brew cup tray 306 within the brew cup 300 in a selected manner may increase or decrease the available volume within one or more walls 302 of the brew cup 300. For example, as illustrated in FIG. 3C, the brew cup tray 306 may be oriented in the brew cup 300 with the one or more dimples 310 facing upward, such that the brew cup 300 is configured to accept up to a 3.5-oz filter pack. By way of another example, as illustrated in FIG. 3D, the brew cup tray 306 may be oriented in the brew cup 300 with the one or more dimples 310 facing downward, such that the volume of the brew cup 300 is reduced and the brew cup 300 is configured to accept only up to a 2.5-oz filter pack. In this regard, the brew cup 300 may be configured to brew different flavors of coffee that may need different brew times and/or more coffee grounds.

The brew cup 300 may include a cup panel 312. The one or more walls 302, the bottom 304, and the cup panel 312 may be fabricated as a single component during the manufacturing process of the brew cup 300. It is noted herein, however, that the cup panel 312 may be a separate component coupled to a wall of the one or more walls 302 (e.g., via an adhesive, a fastener, or the like).

The cup panel 312 may include an operator 314. The operator 314 may include, but is not limited to, a slot, a tab, a bar, or the like. For example, the operator 314 may be a slot between a first front surface of the cup panel 312 and a second front surface extruded a selected distance from a plane defined by the first front surface of the cup panel 312. By way of another example, the operator 314 may be configured to receive and/or interact with at least a portion of a user's hand.

The cup panel 312 and the operator 314 may be fabricated as a single component during the manufacturing process of the brew cup 300. In this regard, the operator 314 provides an added functionality and an increased level of visual aesthetics to the design of the brew cup 300. It is noted herein, however, that the operator 314 may be a separate component (e.g., a handle) coupled to the cup panel 312.

The bottom 304 may include one or more drainage holes 316. For example, the one or more drainage holes 316 may be holes fabricated within the bottom 304. By way of another example, the one or more drainage holes 316 may be within a mesh screen forming at least a portion of the bottom 304.

Figure 4:
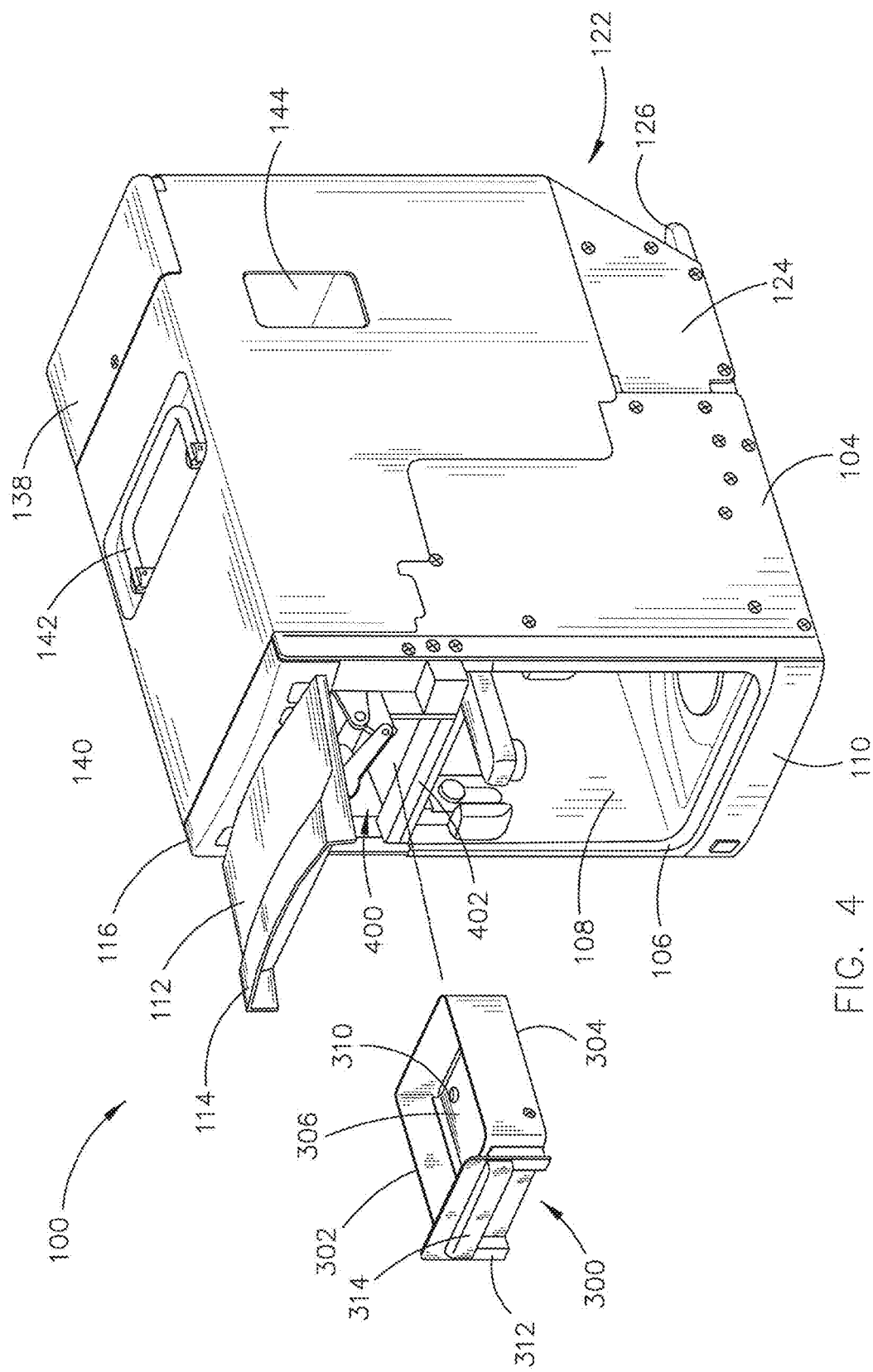
FIG. 4 is a partial exploded view of a diagrammatic illustration of an exemplary embodiment of an aircraft galley brewing apparatus according to the inventive concepts disclosed herein.

Referring now to FIG. 4, a partial exploded view of a diagrammatic illustration of an exemplary embodiment of the brewing apparatus 100 according to the inventive concepts is disclosed herein.

The brewing apparatus 100 may include a brew cup cavity 400 dimensioned to receive the brew cup 300. The brew cup 300 may include one or more safety devices utilized by the brewing apparatus 100 to determine whether the brew cup 300 is located within the brew cup cavity 400. The one or more safety devices may include, but are not limited to, one or more electrical sensors and/or one or more mechanical assemblies known in the art. For example, the one or more electrical sensors and/or one or more mechanical assemblies may include, but are not limited to, one or more pressure sensors, one or more infrared (IR) sensors, one or more magnetic switches, or any sensor known in the art. For instance, the bottom 304 of the brew cup 300 may include one or more magnets that interact with one or more components of the brewing apparatus 100. It is noted herein that the brewing apparatus 100 may be configured to be non-operational when the brew cup 300 is not detected within the brew cup cavity 400.

The brewing apparatus 100 may include at least one chassis bezel 402. For example, a chassis bezel 402 may be coupled to the front chassis assembly 104 and positioned between the brew cup panel 112 and the front chassis assembly 104. The chassis bezel 402 may surround the brew cup cavity 400, separating the brew cup cavity 400 from the brew cup panel 112.

For purposes of the present disclosure, where the brew cup panel 112 is in an "open position" or "open orientation," the brew cup panel 112 may be set at a selected angle from a substantially vertical position relative to a plane generated by a front surface of the front chassis section 102 and/or the chassis bezel 402. It is noted herein the brew cup 300 may be inserted into the brew cup cavity 400 when the brew cup panel 112 is in the "open position" or the "open orientation."

For purposes of the present disclosure, where the brew cup panel 112 is in a "closed position" or "closed orientation," the brew cup panel 112 may be oriented in a substantially vertical position and/or may be oriented in a substantially parallel position relative to a plane generated by a front surface of the front chassis section 102 and/or the chassis bezel 402. For example, a surface of the brew cup panel 112 may make contact with and/or be substantially flush with the front surface of the front chassis section 102 and/or the chassis bezel 402. In this state, the brew cup cavity 400 may be covered and/or not accessible when the brew cup panel 112 is in the "closed position" or the "closed orientation," such that the brew cup 300 is not insertable into the brew cup cavity 400. In addition, in this state the brew cup panel 112 may prevent heated water and/or steam from exiting the brew cup cavity 400.

It is noted herein that the brew cup 300 may be removable and cleanable separate from the brewing apparatus 100. For example, where the brewing apparatus 100 is installed in an aircraft, the brewing apparatus 100 may be left in place and wiped down, but the used brew cup 300 may be pulled, sent through catering, and replaced with a clean brew cup 300, in a similar manner to the server.

Figure 6:
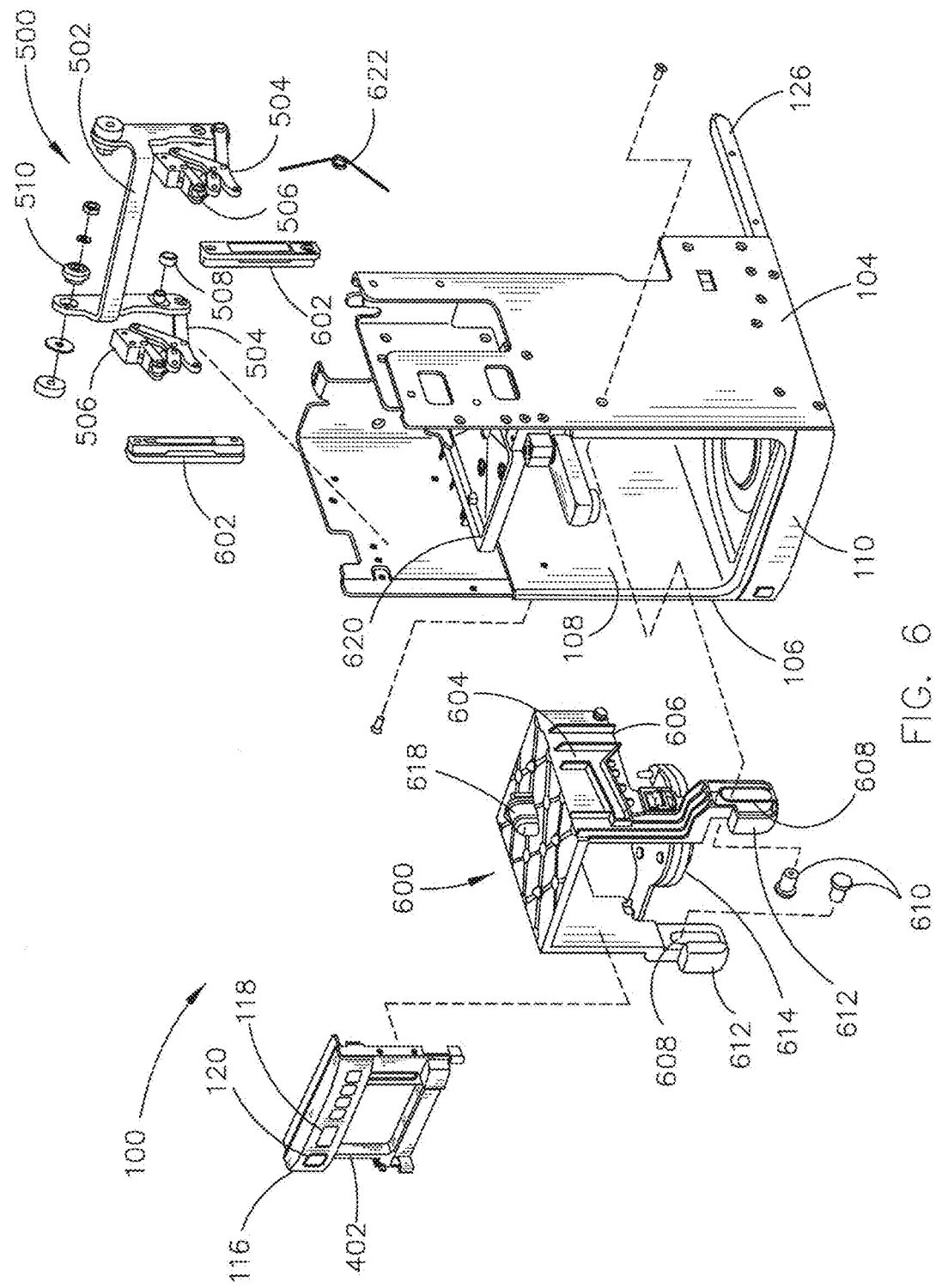
FIG. 6 is an exploded view of a diagrammatic illustration of an exemplary embodiment of an aircraft galley brewing apparatus according to the inventive concepts disclosed herein.

The user interface 116 may be coupled to the chassis bezel 402, as illustrated in FIG. 6. It is noted herein, however, that the brew cup panel 112 and/or the user interface 116 may be directly coupled with the front chassis assembly 104, bypassing the chassis bezel 402. Therefore, the above description should not be interpreted as a limitation on the present disclosure but merely an illustration.

Figure 5:
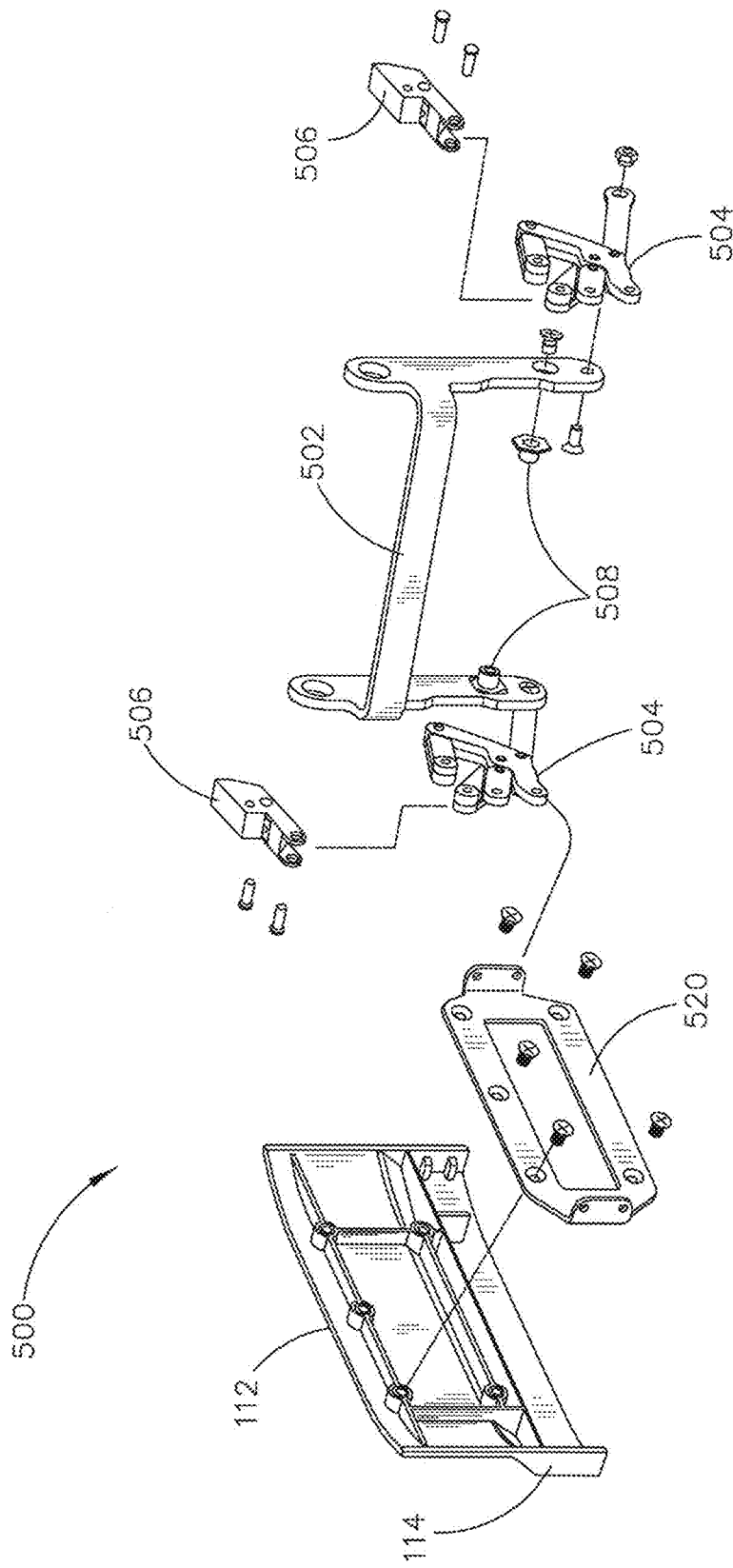
FIG. 5 is an exploded view of a diagrammatic illustration of an exemplary embodiment of a brew cup panel assembly of an aircraft galley brewing apparatus according to the inventive concepts disclosed herein.

Referring now to FIG. 5, an exemplary embodiment of a diagrammatic illustration of a brew cup panel assembly of the brewing apparatus according to the inventive concepts is disclosed herein.

The brew cup panel assembly may include a hinge assembly 500. The hinge assembly 500 may include a crossmember 502. The hinge assembly 500 may include one or more linkage assemblies 504. The one or more linkage assemblies 504 may be coupled to one or more mount brackets 506. For example, the one or more mount brackets 506 may be coupled to a portion of the chassis (e.g., the front chassis assembly 104). The hinge assembly 500 may include one or more rollers 508. For example, the one or more rollers 508 may be configured to interact with one or more components of the brewing apparatus 100.

The brew cup panel assembly may include a panel mounting plate 520. For example, the panel mounting plate 520 may be coupled to a surface (e.g., rear surface) of the brew cup panel 112. The brew cup panel 112 may be coupled to the one or more linkage assemblies 504 via the panel mounting plate 520.

It is noted herein that the brew cup panel 112 is easily detachable and/or replaceable, being coupled to the brewing apparatus 100 only via the panel mounting plate 520. For example, the brew cup panel 112 may include one or more markings (e.g., manufacturer or consumer logos, information either specific to the brewing apparatus 100 or generally required by regulation, or the like) on the first front surface. In this regard, the brew cup panel 112 may be swapped out for a different brew cup panel 112, instead of having to alter the brew cup panel 112 to remove the markings from the first front surface.

In one example, where the user interface 116 is at least partially embedded in the brew cup panel 112, the panel mounting plate 520 may include one or more controller components (e.g., processors, memory, or the like). The one or more controller components may be coupled to a main controller of the brewing apparatus 100 via one or more data couplers, such that the brew cup panel 112 remains easily detachable and/or replaceable FIGS. 6 and 7 generally illustrate exploded views of a diagrammatic illustration of an exemplary embodiment of the brewing apparatus 100 according to the inventive concepts disclosed herein.

Referring now to FIG. 6, the hinge assembly 500 may be configured to couple to the front chassis assembly 104 via one or more bushings 510 coupled to the crossmember 502. For example, the hinge assembly 500 may be configured to rotate about an axis through the one or more bushings 510 when a force is applied to the hinge assembly 500 (e.g., a force applied via the operator 114 of the brew cup panel 112).

The front chassis assembly 104 may include one or more tracks 602. For example, the one or more tracks 602 may include, but are not limited to, one or more rails or grooves.

The front chassis assembly 104 may include a brew head assembly 600. The brew head assembly 600 may include one or more tracks 604. For example, the one or more tracks 604 may include, but are not limited to, one or more rails or grooves. The one or more rollers 508 of the hinge assembly 500 may be inserted in and engage the one or more tracks 604. The brew head assembly 600 may include one or more tracks 606. For example, the one or more tracks 606 may include, but are not limited to, one or more rails or grooves. The one or more tracks 606 may be configured to receive the one or more tracks 602 coupled to the front chassis assembly 104.

The brew cup panel 112 may be configured to actuate the brew head assembly 600 in a selected direction.

For example, a user may provide a force to open the brew cup panel 112 via the operator 114. The force may be applied to the hinge assembly 500, and the one or more rollers 508 may be inserted in and translate along the one or more tracks 604 in a first direction, engaging a first wall of the one or more tracks 604 and causing the brew head assembly 600 to raise, while the crossmember 502 rotates about an axis through the one or more bushings 510. It is noted herein the one or more tracks 602 may assist in raising, lowering, and/or guiding the brew head assembly 600, as the one or more tracks 602 are inset within the one or more tracks 606 of the brew head assembly 600.

By way of another example, a user may provide a force to close the brew cup panel 112 via the operator 114. The force may be applied to the hinge assembly 500, and the one or more rollers 508 may translate along the one or more tracks 604 in a second direction, engaging a second wall of the one or more tracks 604 and causing the brew head assembly 600 to lower, while the crossmember 502 rotates about the axis through the one or more bushings 510. It is noted herein the one or more tracks 602 may assist in raising, lowering, and/or guiding the brew head assembly 600, as the one or more tracks 602 are inset within the one or more tracks 606 of the brew head assembly 600.

In this regard, the brew cup panel 112 may be coupled to the brew head assembly 600 such that opening the brew cup panel 112 via the operator 114 raises the brew head assembly 600 and closing the brew cup panel 112 via the operator 114 lowers the brew head assembly 600.

The brew head assembly 600 may include one or more server restraints configured to secure the server within the cavity 108 of the server base 106.

The one or more server restraints may include one or more arms 608. The one or more arms 608 may include one or more slots configured to receive one or more pins 610, where the one or more pins 610 are fixed to at least one of the front chassis assembly 104 and/or the server base 106. For example, the one or more slots may contain the one or more pins 610 and slide up and/or down relative to the fixed pin when the brew head assembly 600 is raised and/or lowered. The one or more arms 608 may include one or more protrusions 612 (e.g., one or more pads). For example, the one or more protrusions 612 may be configured to engage and/or disengage (e.g., make contact with and/or detach from) an exterior surface of a server positioned within the cavity 108 of the server base 106 when the brew cup panel 112 is in a closed position or closed orientation.

The one or more server restraints may include a puck or stopper 614. The puck or stopper 614 may be configured to engage and/or disengage (e.g., make contact with and/or detach from) the server when the brew cup panel 112 is in a closed position or closed orientation. For example, the puck or stopper 614 may be configured to engage and/or make contact with at least one of an interior surface of the server through an opening at the top of the server and/or a top edge or rim of the server.

Figure 7:
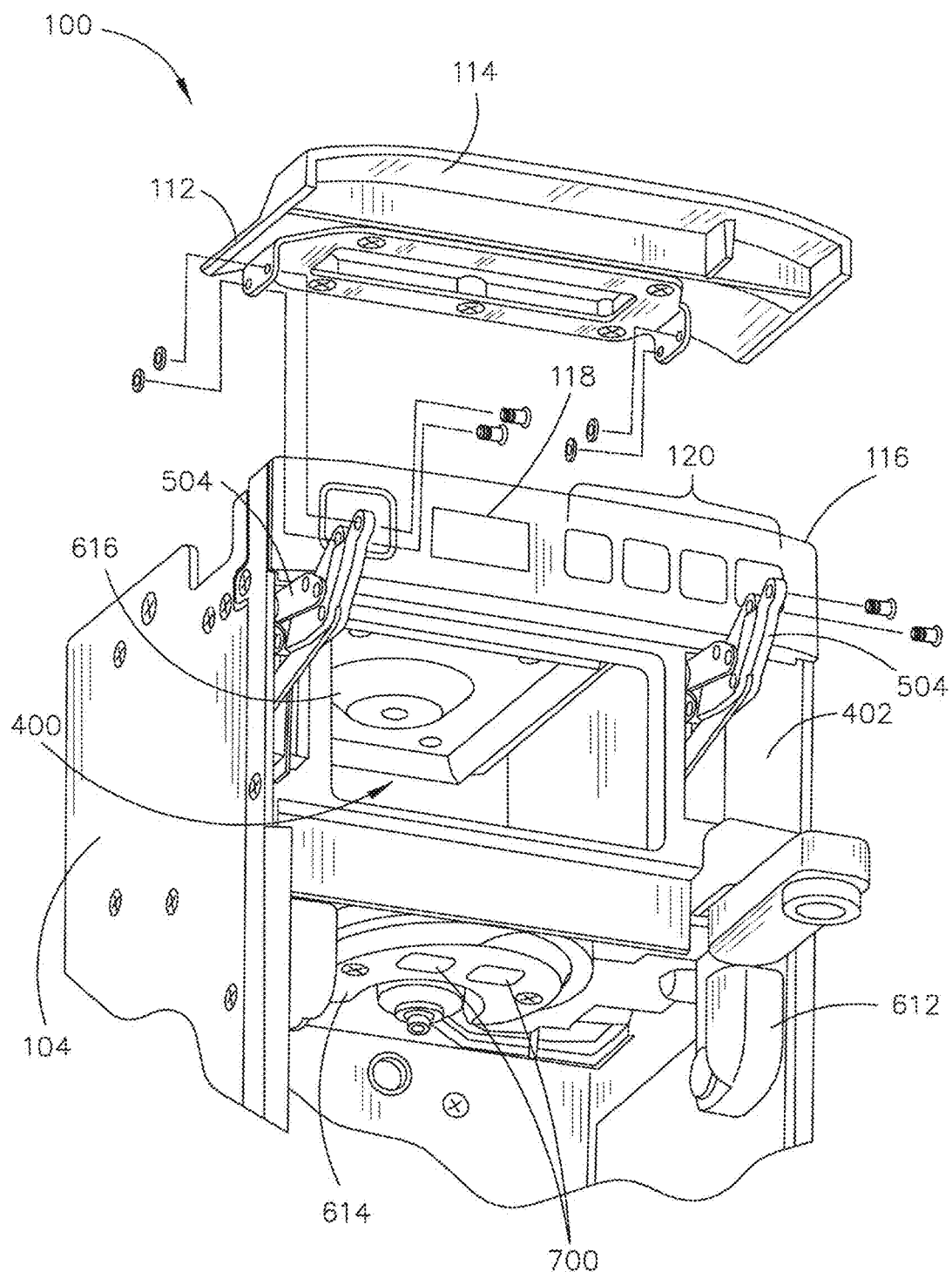
FIG. 7 is a partial exploded view of a diagrammatic illustration of an exemplary embodiment of an aircraft galley brewing apparatus according to the inventive concepts disclosed herein.

Referring now to FIG. 7, the puck or stopper 614 may include one or more sensors 700. For example, the one or more sensors 700 may include, but are not limited to, one or more IR sensors, one or more light-emitting diode (LED) phototransistors, or the like. The one or more sensors 700 may be implemented to determine whether the server is within the cavity 108 of the server base 106. Alternatively or in addition, the one or more sensors 700 may be implemented to determine whether the server still contains liquid from a previous brew cycle.

Referring again to FIG. 6, the puck or stopper 614 may be coupled to the brew head assembly 600 via a bracket. A spring may be inserted where the bracket and the brew head assembly 600 are coupled together. In this regard, the bracket including the puck or stopper 614 may not be entirely fixed relative to the position of the brew head assembly 600, but instead include an ability to translate some amount in a vertical motion relative to the position of the brew head assembly 600 as a server is positioned and/or removed from underneath the puck or stopper 614 within the cavity 108 of the server base 106.

The brew head assembly 600 may include one or more brew cup 300 restraints. As illustrated in FIG. 7, the one or more brew cup 300 restraints may include a brew head 616 coupled to an underside of the brew head assembly 600. The brew head 616 may be configured to engage and/or disengage (e.g., make contact with and/or detach from) the brew cup 300 when the brew cup panel 112 is in a closed position or closed orientation. For example, the one or more brew heads 616 may be configured to engage and/or make contact with a top edge or rim of the brew cup 300.

The brew head assembly 600 may include a manifold 618. The manifold 618 may be coupled to a solenoid 202. The manifold 618 may be coupled to the brew head 616. Water may flow through the brew head 616 to interact with a filter pack placed within the brew cup 300 while the brew cup 300 is positioned within the brew cup cavity 400.

The front chassis assembly 104 may include a brew cup shelf 620. It is noted herein the brew cup cavity 400 may be a space including one or more dimensions defined by the brew head assembly 600 and the brew cup shelf 620.

Figure 8A:
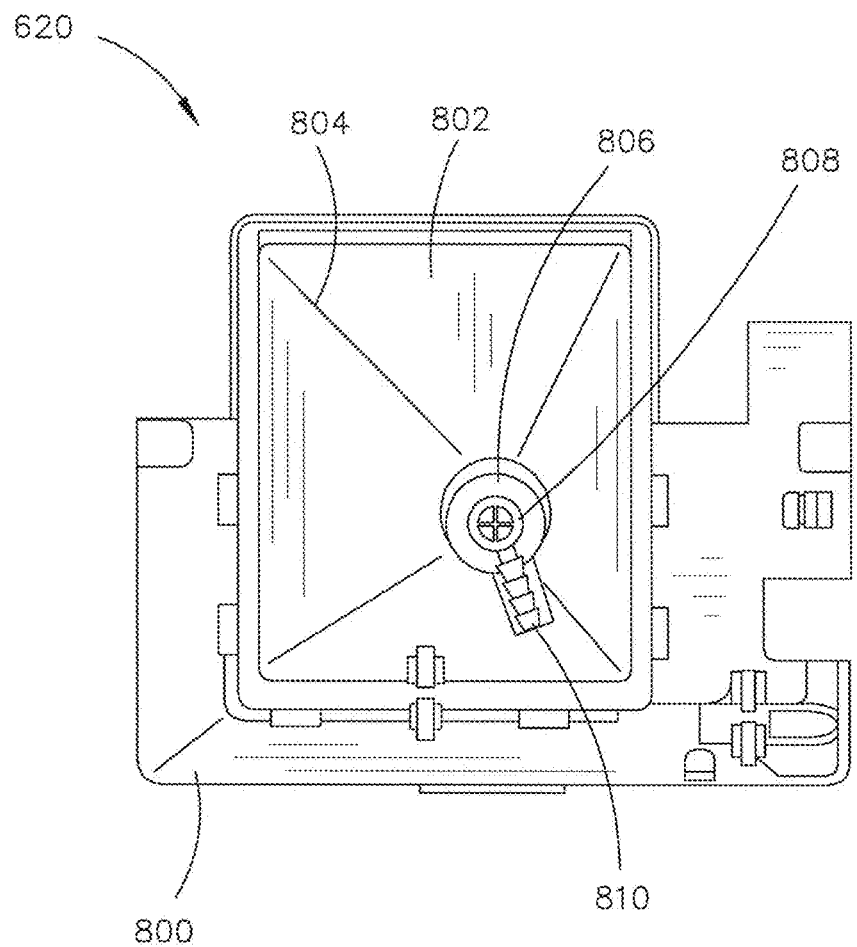
FIG. 8A is a bottom view of a diagrammatic illustration of an exemplary embodiment of a brew cup shelf of an aircraft galley brewing apparatus according to the inventive concepts disclosed herein.
Figure 8B:
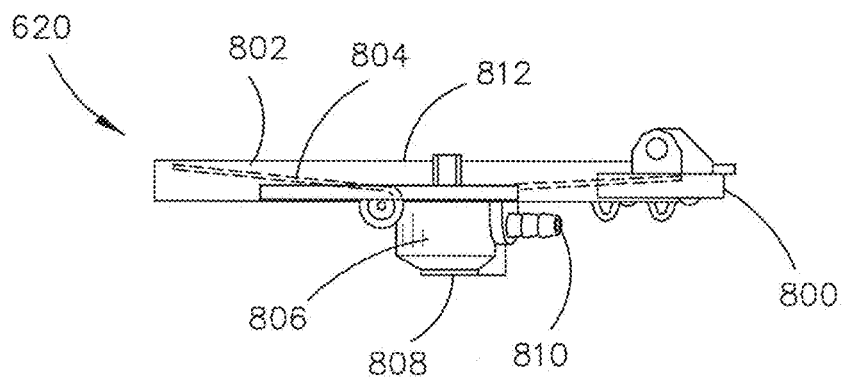
FIG. 8B is a side view of a diagrammatic illustration of an exemplary embodiment of a brew cup shelf of an aircraft galley brewing apparatus according to the inventive concepts disclosed herein.

FIGS. 8A and 8B generally illustrate the brew cup shelf 620 of the brewing apparatus 100 according to the inventive concepts disclosed herein.

The brew cup shelf 620 may include a frame 800. For example, the frame 800 may couple to the front chassis assembly 104. The brew cup shelf 620 may include a recess 802 dimensioned to receive the brew cup 300. The recess 802 may include one or more slanted surfaces 804. For example, the one or more slanted surfaces 804 may be orientated at a select angle relative to a substantially horizontal plane.

The brew cup shelf 620 may include one or more nozzles 806 configured to receive coffee brewed by passing heated water through a filter pack including coffee grounds within the brew cup 300. The one or more nozzles 806 may include one or more holes 808. The one or more holes 808 may act as one or more flow control components to regulate the flow of a liquid into the server within the cavity 108 of the server base 106. For example, the one or more holes 808 may control and/or direct the brewed coffee as it drips from the recess 802 into the server within the cavity 108 of the server base 106. By way of another example, the one or more holes 808 may control and/or direct heated water from a nozzle 810, where the nozzle 810 is coupled to a solenoid 202 different from the solenoid 202 coupled to the manifold 618. In this regard, the server may be provided with heated water from at least two sources, to brew either coffee or another heated liquid (e.g., tea, or the like) without cross-contamination.

The recess 802 is surrounded by one or more ledges 812. For example, the one or more ledges 812 may be configured to hold the brew cup 300 when the brew cup 300 is set within the recess 802. In this regard, the one or more ledges 812 act as a restraint to prevent the brew cup 300 from dismounting during operation of the brewing apparatus 100.

Referring again to FIG. 6, a spring 622 is coupled to the at least one of the front chassis assembly 104, the hinge assembly 500, and/or the brew head assembly 600. For example, the spring 622 may provide a returning force against the brew head assembly 600. For instance, the force provided by the spring 622 may maintain the brew cup panel 112 in at least one of an open position and/or a closed position when no external force is applied to the brew cup panel 112 (e.g., force applied by a user on the operator 114 of the brew cup panel 112).

Figure 9:
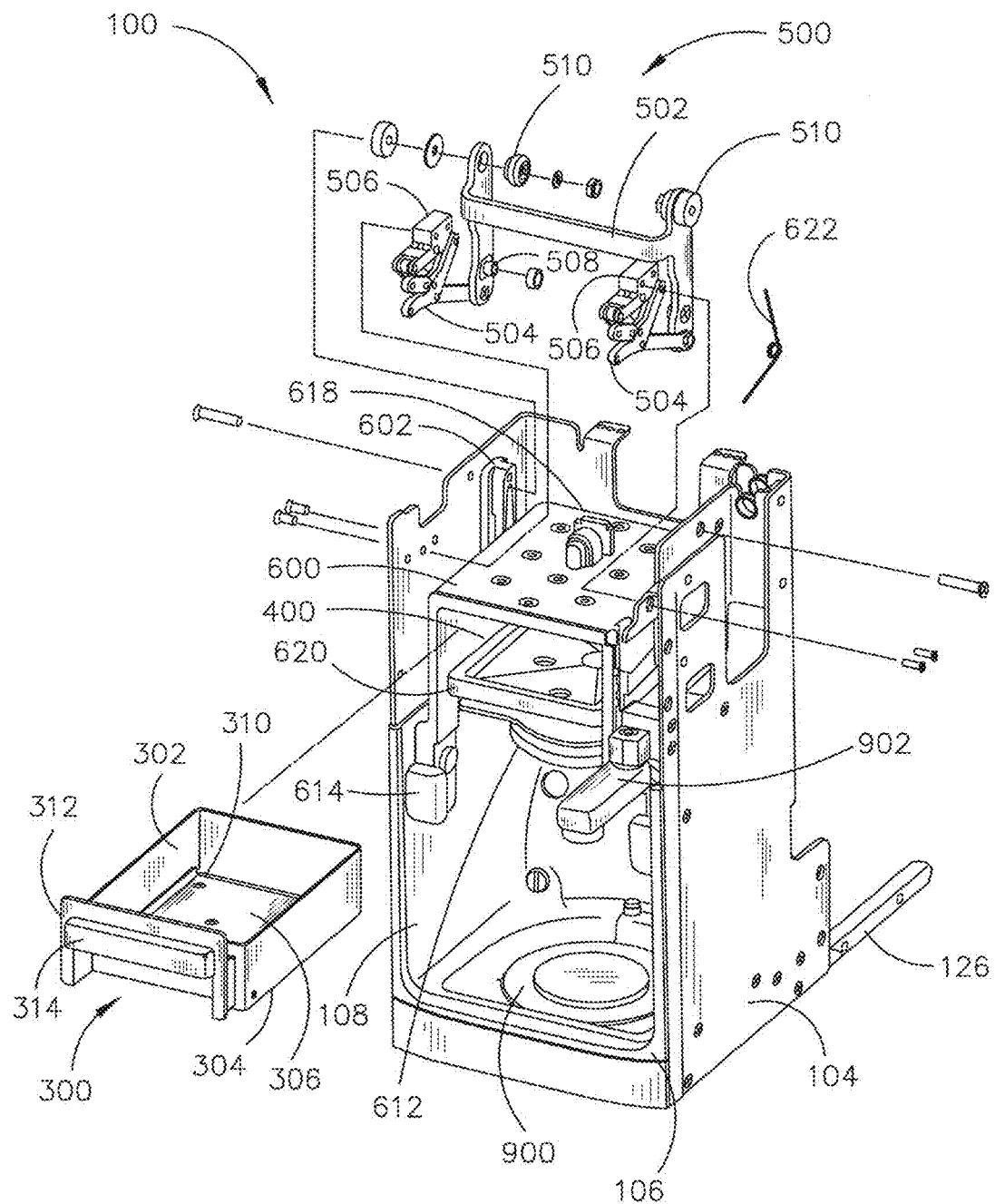
FIG. 9 is a partial exploded view of a diagrammatic illustration of an exemplary embodiment of an aircraft galley brewing apparatus according to the inventive concepts disclosed herein.

Referring now to FIG. 9, a partial exploded view of a diagrammatic illustration of an exemplary embodiment of the brewing apparatus 100 according to the inventive concept is disclosed herein.

The front chassis section 102 may include a platen heater 900 within the cavity 108 of the server base 106. For example, the platen heater 900 may be configured to at least heat the server within the cavity 108 of the server base 106 such that liquid within the container may be maintained at a selected temperature. It is noted herein, however, that the brewing apparatus 100 may not include a platen heater 900. For example, the brewing apparatus 100 may not include a platen heater 900 when the server is insulated. Therefore, the above description should not be interpreted as a limitation on the present disclosure but merely an illustration.

The front chassis section 102 may include one or more faucets 902. For example, the one or more faucets 902 may be pivotable and/or extendable, such that the one or more faucets 902 collapse or fold against the front chassis assembly 104 (e.g., against the server base 106, the chassis bezel 402, or the like). By way of another example, the one or more faucets 902 may be fixed in place. The one or more faucets 902 may be coupled to a solenoid 202 different from the solenoids 202 coupled to the manifold 618 and/or the nozzle 810. In this regard, the brewing apparatus 100 may include a third distributor of heated water, to brew either coffee or another heated liquid (e.g., tea, or the like).

An exemplary embodiment of a method according to the inventive concepts disclosed herein may include one or more of the following steps. It is noted herein the method is not limited to the steps provided. For example, the method may instead include more or fewer steps. By way of another example, the method may perform the steps in an order other than provided. Therefore, the above description should not be interpreted as a limitation on the scope of the present disclosure, but merely an illustration.

A step may include opening the brew cup panel 112. For example, opening the brew cup panel 112 may disengage the one or more server restraint components (e.g., the puck or stopper 614 or the one or more protrusions 612 of the one or more arms 608) from the server within the cavity 108 of the server base 106. By way of another example, opening the brew cup panel 112 may disengage the one or more brew cup 300 restraint components (e.g., the brew head 616) from the brew cup 300 within the brew cup cavity 400.

A step may include removing the brew cup 300 from the brew cup cavity 400 behind the brew cup panel 112. For example, the brew cup 300 may be removed from the recess 802 and subsequently lose contact with or disengage from the one or more ledges 812. A step may include placing a filter pack within the brew cup 300. A step may include inserting the brew cup 300 in the brew cup cavity 400. For example, the brew cup 300 may be inserted into the recess 802 and subsequently make contact with or engage the one or more ledges 812.

A step may include closing the brew cup panel 112. For example, closing the brew cup panel 112 may engage the one or more server restraint components (e.g., the puck or stopper 614 or the one or more protrusions 612 of the one or more arms 608) to the server within the cavity 108 of the server base 106. By way of another example, closing the brew cup panel 112 may engage the one or more brew cup 300 restraint components (e.g., the brew head 616) against the brew cup 300 within the brew cup cavity 400.

An exemplary embodiment of a method according to the inventive concepts disclosed herein may include one or more of the following steps. It is noted herein the method is not limited to the steps provided. For example, the method may instead include more or fewer steps. By way of another example, the method may perform the steps in an order other than provided. Therefore, the above description should not be interpreted as a limitation on the scope of the present disclosure, but merely an illustration.

A step may include receiving a brew command. A step may include performing one or more safety checks to determine whether the brew cup and/or the server is correctly positioned. For example, closing the brew cup panel 112 may transmit a ready signal and/or engage one or more safety devices to indicate the brewing system of the brewing apparatus 100 is operable. For instance, closing the brew cup panel 112 may trigger one or more safety systems that transmit a ready signal to the controller that the brewing system of the brewing apparatus 100 is operable. By way of another example, inserting the brew cup 300 into the recess 802 of the brew cup shelf 620 may engage one or more safety devices (e.g., magnetic switch, or the like) to indicate the brewing system of the brewing apparatus 100 is operable.

A step may include checking water levels. For example, the water levels within the tank 200 may be checked. By way of another example, the water levels in the server within the cavity 108 of the server base 106 may be checked. A step may include checking temperature levels of the water within the brewing apparatus 100.

A step may include opening a selected solenoid 202 based on the brew command received from the user following completion of the one or more safety checks. A step may include engaging one or more brewing system safety operations. For example, the one or more brewing system safety operations may include monitoring of the fluid within the server via the one or more IR sensors 700. By way of another example, the one or more brewing system safety operations may include self-termination after a predefined time period. For instance, the predefined time period may include, but is not limited to, fifteen minutes.

As will be appreciated from the above, embodiments of the inventive concepts disclosed herein are directed to a brewing apparatus, where the brewing apparatus includes the capability to hold a filter pack within a brew cup behind a brew cup panel and the capability to engage a container housed within a container chamber during operation of the brewing apparatus, where the apparatus is configured to couple to and operate in an aircraft galley.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried out in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed:

1. A brewing apparatus, comprising:
a chassis dimensioned to fit within a compartment of an aircraft galley, the chassis comprising:
   a front chassis section;
   a rear chassis section; and
   one or more guide rails configured to couple the front chassis section and the rear chassis section, the one or more guide rails configured to engage one or more tracks in the aircraft galley compartment;
the front chassis section comprising:
   a server base including a cavity configured to receive a server;
   a brew cup cavity configured to receive a brew cup;
   a brew cup shelf including a recess, the recess configured to receive the brew cup;
   a brew head assembly, the brew head assembly including at least one of one or more server restraints or one or more brew cup restraints; and
   a brew cup panel assembly, comprising:
      a hinge assembly configured to engage the brew head assembly; and
      a brew cup panel, the brew cup panel forming a portion of an exterior trim of the brewing apparatus, the brew cup panel positioned outside of the brew cup cavity and configured to cover the brew cup cavity, the brew cup panel coupled to the hinge assembly, the brew cup panel configured to adjust the brew head assembly in a selected direction via actuation of the hinge assembly.

2. The apparatus in claim 1, the brew cup panel including an operator, the operator comprising a slot between a first front surface of the brew cup panel and a second front surface extruded a select distance from a plane defined by the first front surface of the brew cup panel, the first front surface and the second front surface being fabricated as a single component.

3. The apparatus in claim 1, the hinge assembly comprising:
   one or more crossmembers including one or more bushings;
   one or more linkage assemblies;
   one or more brackets; and
   one or more rollers,
   the hinge assembly coupled to the front chassis section via at least one of the one or more brackets or the one or more bushings,
   the one or more rollers configured to engage one or more tracks on an exterior surface of the brew head assembly.

4. The apparatus in claim 1, comprising:
   at least one detent coupled to the brew head assembly, the at least one detent configured to hold the brew cup panel in a selected orientation.

5. The apparatus in claim 4, the selected orientation of the brew cup panel including an orientation parallel to a plane generated by a front surface of the front chassis section.

6. The apparatus in claim 4, the selected orientation of the brew cup panel including an orientation at an angle relative to a plane generated by a front surface of the front chassis section.

7. The apparatus in claim 1, the front chassis section comprising a chassis bezel.

8. The apparatus in claim 7, comprising:
   a user interface comprising at least one of one or more display devices or one or more user input devices.

9. The apparatus in claim 8, the user interface coupled to at least one of the chassis bezel or the brew cup panel.

10. The apparatus in claim 1, the one or more server restraints including one or more protrusions on one or more arms, the one or more protrusions configured to at least one of engage or disengage an exterior surface of the server when the brew head assembly is adjusted in the selected direction via the actuation of the hinge assembly.

11. The apparatus in claim 1, the one or more server restraints including one or more stoppers, the one or more stoppers configured to at least one of engage or disengage an interior surface of the server when the brew head assembly is adjusted in the selected direction via actuation of the hinge assembly.

12. The apparatus in claim 11, the one or more stoppers including one or more sensors configured to determine at least one of a position of the server within the cavity of the server base or an amount of liquid in the server.

13. The apparatus in claim 1, the brew cup comprising:
   one or more walls and a bottom, the bottom including one or more holes, the bottom including one or more protrusions; and
   a brew cup tray including one or more dimples corresponding to the one or more protrusions of the bottom, the brew cup tray coupled to the one or more walls, the brew cup tray being rotatable within the one or more walls between a first rotated position and a second rotated position, the brew cup tray being orientable within the one or more walls between a first oriented position and a second oriented position.

14. The apparatus in claim 13, the brew cup tray configured to hold a coffee filter pack, the brew cup tray configured to retain a liquid against the coffee filter pack during a brewing cycle for a selected period of time prior to the liquid exiting through the one or more holes in the bottom of the brew cup tray.

15. The apparatus in claim 13, the one or more brew cup restraints including a brew head, the brew head configured to at least one of engage or disengage a top edge of the one or more walls of the brew cup when the brew head assembly is adjusted in the selected direction via actuation of the hinge assembly.

16. The apparatus in claim 1, the chassis comprising:
one or more tanks and one or more solenoids; and
a cover assembly configured to enclose at least one of the one or more tanks or the one or more solenoids.

17. The apparatus in claim 16, the one or more solenoids comprising:
a brew head solenoid configured to provide a liquid to the brew head assembly,
a brew cup shelf solenoid configured to provide a liquid to the brew cup shelf; and
a faucet solenoid configured to provide a liquid to a faucet.

18. The apparatus in claim 16, the rear chassis section comprising:
a connector plate, the connector plate including at least one of one or more data couplers or one or more fluidic couplers; and
an access cover configured to provide access to one or more components enclosed by the cover assembly.

19. A brewing apparatus, comprising:
a chassis dimensioned to fit within a compartment of a vehicle, the chassis comprising:
a front chassis section;
a rear chassis section; and
one or more guide rails configured to couple the front chassis section and the rear chassis section, the one or more guide rails configured to engage one or more tracks in the vehicle compartment;
the front chassis section comprising:
a server base including a cavity configured to receive a server;
a brew cup cavity configured to receive a brew cup;
a brew cup shelf including a recess, the recess configured to receive the brew cup;
a brew head assembly, the brew head assembly including at least one of one or more server restraints or one or more brew cup restraints; and
a brew cup panel assembly, comprising:
a hinge assembly configured to engage the brew head assembly; and
a brew cup panel, the brew cup panel forming a portion of an exterior trim of the brewing apparatus, the brew cup panel positioned outside of the brew cup cavity and configured to cover the brew cup cavity, the brew cup panel coupled to the hinge assembly, the brew cup panel configured to adjust the brew head assembly in a selected direction via actuation of the hinge assembly.

20. A brewing apparatus, comprising:
a chassis, comprising:
a front chassis section;
a rear chassis section; and
one or more guide rails configured to couple the front chassis section and the rear chassis section;
the front chassis section comprising:
a server base including a cavity configured to receive a server;
a brew cup cavity configured to receive a brew cup;
a brew cup shelf including a recess, the recess configured to receive the brew cup;
a brew head assembly, the brew head assembly including at least one of one or more server restraints or one or more brew cup restraints; and
a brew cup panel assembly, comprising:
a hinge assembly configured to engage the brew head assembly; and
a brew cup panel, the brew cup panel forming a portion of an exterior trim of the brewing apparatus, the brew cup panel positioned outside of the brew cup cavity and configured to cover the brew cup cavity, the brew cup panel coupled to the hinge assembly, the brew cup panel configured to adjust the brew head assembly in a selected direction via actuation of the hinge assembly.

* * * * *